United States Patent [19]

Smith

[11] 4,194,330
[45] Mar. 25, 1980

[54] NAILABLE STEEL FLOOR CHANNEL WITH ANTI-SKID SURFACE

[75] Inventor: James T. Smith, Valparaiso, Ind.

[73] Assignee: National Steel Corporation, Pittsburgh, Pa.

[21] Appl. No.: 873,074

[22] Filed: Jan. 27, 1978

[51] Int. Cl.² ............................................. E04F 11/16
[52] U.S. Cl. ........................................ 52/177; 52/377; 52/828
[58] Field of Search ................. 52/177, 377, 588, 814, 52/828, 827

[56] References Cited

U.S. PATENT DOCUMENTS

| | | | |
|---|---|---|---|
| 1,091,214 | 3/1914 | Gruber | 52/177 X |
| 1,657,446 | 1/1928 | Nagin et al. | 182/222 X |
| 2,153,347 | 4/1939 | Schenck | 404/21 |
| 2,273,208 | 2/1942 | Lambert | 182/228 |
| 2,670,060 | 2/1954 | Fenske | 52/181 |
| 2,691,330 | 10/1954 | Van Sciver | 52/180 |
| 2,852,112 | 9/1958 | Shay | 52/377 |
| 2,900,055 | 8/1959 | Shaver | 52/377 |
| 2,955,687 | 10/1960 | Seim | 52/377 |
| 3,093,216 | 6/1963 | Dunham | 52/180 |
| 3,324,616 | 6/1967 | Brown | 52/377 |
| 3,365,221 | 1/1968 | Jureit | 52/173 R |

Primary Examiner—Alfred C. Perham
Attorney, Agent, or Firm—Stanley, O'Neil and Baker

[57] ABSTRACT

A steel floor construction for freight hauling vehicles includes a plurality of elongated floor planking members arranged in side-by-side relation to provide a load bearing floor with a nailing groove between adjacent planking members. Each plank includes a downwardly open channel member having a relatively wide central web supported along its edges by integrally formed downwardly extending flanges, with the web being reinforced along its length by an upwardly directed generally U-shaped member welded to its bottom surface and having a pattern of anti-skid projections die-formed on and project upwardly from its top surface. The channels are progressively roll formed from a continuous length of strip steel by passing the strip through a series of forming roll pairs. A pair of die rolls are employed between two adjacent sets of forming rolls, with the die rolls being driven together and cooperating to form the anti-skid projections by a cold forming process after the sheet has been partially formed into this channel shape by passing through a plurality of the sets of forming rolls. The U-shaped reinforcing member is welded to the strip after the anti-skid projections are formed.

4 Claims, 17 Drawing Figures

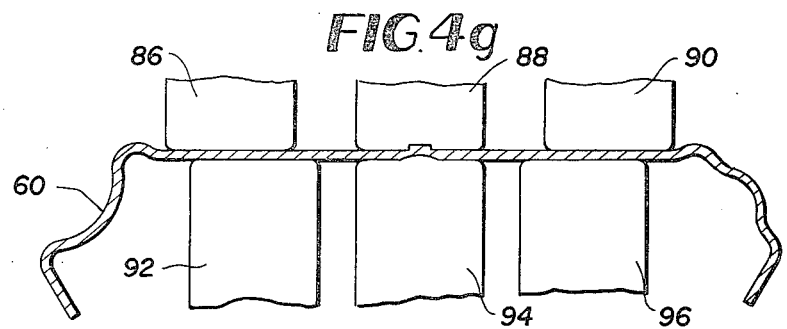
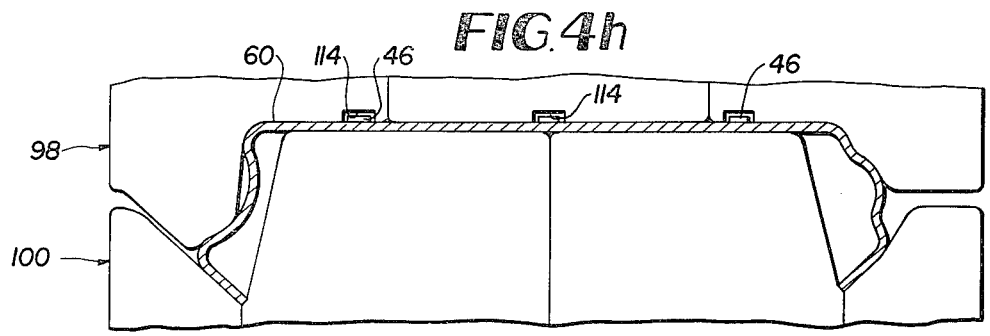
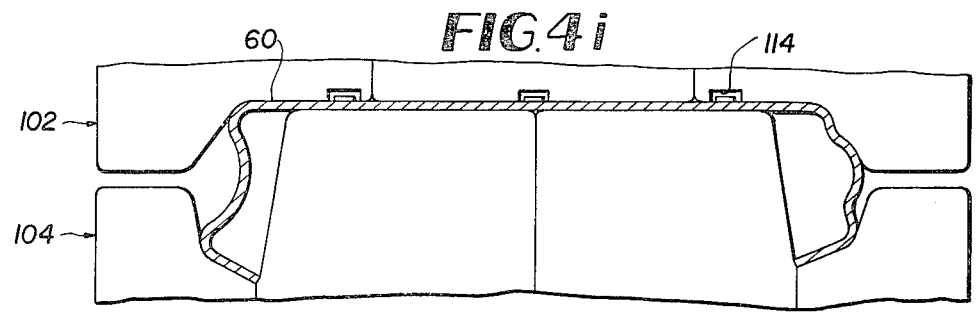
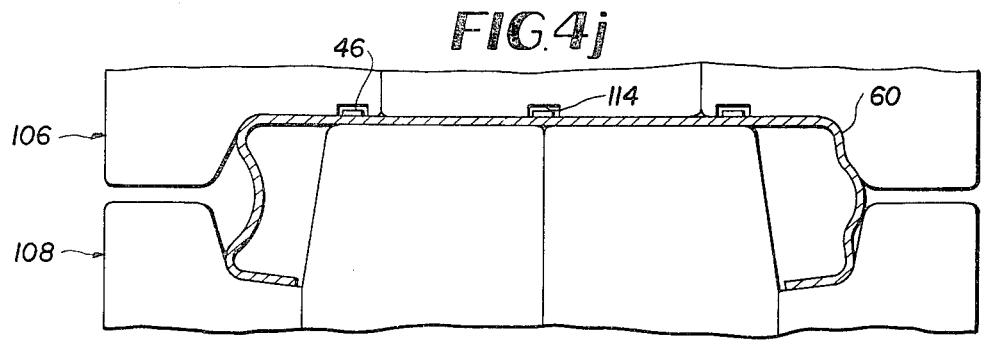
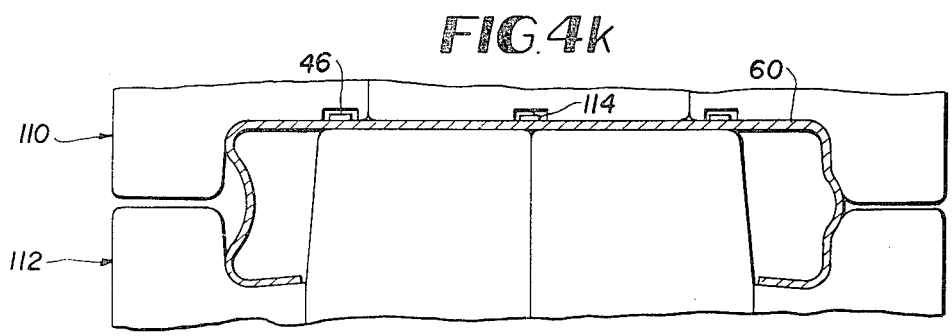

NAILABLE STEEL FLOOR CHANNEL WITH ANTI-SKID SURFACE

BACKGROUND OF THE INVENTION

1. Field of the Invention

This invention relates to a nailable steel flooring for freight handling vehicles, and more particularly to nailable steel floor planking members having an improved anti-skid load bearing surface and to a method of manufacturing such planking members.

2. Description of the Prior Art

Freight handling vehicles such as trucks and rail cars, hereinafter generally referred to as cars or rail cars, are known in which the load supporting floor is constructed of transversly extending steel planking members supported on longitudinally extending beams or girders. The planking members have conventionally been of a generally channel shaped construction with the central web of the channel forming the load bearing surface and the side flanges extending downwardly and being supported on the girders. The side flanges are generally of complex shape and may include inwardly directed terminal portions which engage the girders to support the floor structure. The downwardly extending portions of the side flanges are normally of compound-curve configuration and include spacer members for engaging the side flanges of adjacent planking members to provide a nailing groove for securing articles to the floors to prevent shifting during hauling. The cooperating compound-curved side flanges of adjacent planking members are of complementary nature to provide a substantially uniform spacing in the nailing grooves. It is also known to reinforce the channel members by a structural member extending beneath and welded to the bottom surface of the central web of the channel.

As is well known, the prior art nailable steel floorings have generally had relatively low friction load support surfaces, which surfaces tend to become more slippery with use as a result of the polishing effect of articles being moved over the surface during normal use. This slippery condition of the floors is accentuated by foreign matter such as oils, water and other liquids or fine solids such as grains, sand, granular or pelletized chemicals or the like which are frequently spilled on the floor. This slippery condition not only increases the loads placed on the nails driven into the nailing grooves to anchor the individual articles for shipping, but also presents a substantial hazard to personnel loading and unloading the cars and can make it difficult to maneuver material handling equipment such as forklift trucks or the like commonly used in loading and unloading cars.

Attempts have been made to provide an anti-skid surface on nailable steel flooring planks, but the prior art attempts have not been entirely satisfactory and are not widely used. One such prior art system is shown in U.S. Pat. No. 2,670,060 which discloses the concept of providing an anti-skid surface on a nailable steel flooring plank by forming a series of transversly extending channel-like depressions in the top of the flooring planks to structurally reinforce the web of the channel, and then filling the depressions with a resilient anti-skid material. While this material is effective in providing a less slippery surface for load handling equipment and personnel, it has limited effect on heavy, rigid articles which are supported primarily by the metal surface as on metal bases, wooden pallets, skids or the like.

It is also known to apply an anti-skid metal sheathing to the load bearing surface of non-metal floors, for example wooden floors, one such system being shown in U.S. Pat. No. 3,365,221. The metal sheathing disclosed in this patent has a number of circular openings formed by a punching operation which results in the periphery of the openings having sharp, upturned edges which provide the anti-skid feature of the surface. Articles may be secured to the wooden floor beneath the sheathing by nails driven through the circular openings. The sheathing is secured to the wooden floors by spikes struck from the metal plate used to form the sheathing.

Anti-skid surfaces are also commonly provided on metal plate members employed as walkways, stair treads, catwalks, ladder rungs, balconies, and the like. Such known anti-skid surfaces include raised portions formed in a continuous pattern on one surface of metal plate, open gratings such as expanded metal, and patterns formed by rupturing and/or deforming segments of an original smooth, flat metal plate. Anti-skid panel formed by the later method is disclosed in U.S. Pat. No. 3,093,216 in which relatively thin gauge flat metal plate is initially provided with a series of parallel strengthening ribs, with rows of conical, sharp edged openings formed between the ribs. The ribs are of a height to enable trucks to roll therealong without being bumped by the conical, perforated anti-skid bumps, or openings. After the ribs and perforations are formed in the respective plates, the edges are turned under to form a channel shaped panel.

The relatively heavy gauge metal required to provide the strength and damage resistance required in a railway car floor, and the high speed precision forming techniques required for commercial production of nailable steel floor planking members, make it impractical to manufacture such planking members from sheet stock having anti-skid elements performed on its surface. Such commercial production techniques require the main channel element of the planking members to be continuously roll formed from strip stock supplied to the forming apparatus in large coils. The strip is unwound and passed through straightening rolls before being passed to and through a series of pairs of forming rolls to be progressively roll formed to the channel configuration. Accurate control of the forming operation is necessary in order to provide the necessary close tolerances on the nailing groove provided between adjacent planking members in a flooring assembly. This groove must be of sufficient width to permit the driving of nails into the groove with the nail following the compound-curve configuration of the channel flanges and with the spacing of the flanges being such as to provide the necessary degree of frictional resistance to withdraw the nail to enable heavy freight articles to be firmly secured in position on the floor. The rolling operation necessarily requires firm contact between the forming rolls and the flat surface of the strip stock being rolled into the planking channel.

SUMMARY OF THE INVENTION

It is the primary object of the present invention to provide a method for high speed continuous forming of improved nailable steel floor planking members, having an improved anti-skid surface thereon, from coiled strip steel stock.

Another object of the invention is to provide an improved nailable steel floor planking member having an anti-skid load bearing surface integrally formed thereon.

In the attainment of the foregoing and other objects and advantages, an important feature of the invention resides in the die-forming of a uniform pattern of anti-skid elements projecting upwardly from the load bearing surface of the nailable steel floor plank members, with the anti-skid elements having substantially flat top surfaces extending essentially parallel to the load bearing surface of the planking element and having side edges extending substantially normal to the surface of the planking element to provide improved anti-skid features. The anti-skid elements may be in the form of short, substantially cylindrical button-like projections formed on the top surface of the planking member from metal which is cold formed from the body of the planking element by a die-forming operation after the flat sheet stock used to form the channel of the planking member has passed through the straightening rolls and through at least a portion of the forming rolls. The anti-skid members are preferably formed by a punch and die roll pair driven in synchronization, with the die roll having a plurality of die cavities formed in its outer periphery and the punch roll having a plurality of raised pressure forming elements on its outer periphery to apply sufficient pressure to the strip stock as it passes between the forming rolls to cause the material in the strip to be cold formed into the die cavity. This process provides a relatively sharp edge surface around the top of the anti-skid members without shearing and consequently weakening the body of the strip material from which the anti-skid members are formed.

BRIEF DESCRIPTION OF THE DRAWINGS

The foregoing and other objects and advantages of the invention will become more apparent from the detailed description thereof contained hereinbelow, taken in conjunction with the drawings in which:

FIGS. 4a through 4k are views showing fragments of the series roll forming elements employed to shape flat steel stock into the main channel of the nailable steel flooring element, including the formation of the anti-skid surface;

DESCRIPTION OF THE PREFERRED EMBODIMENT

Figure 1:
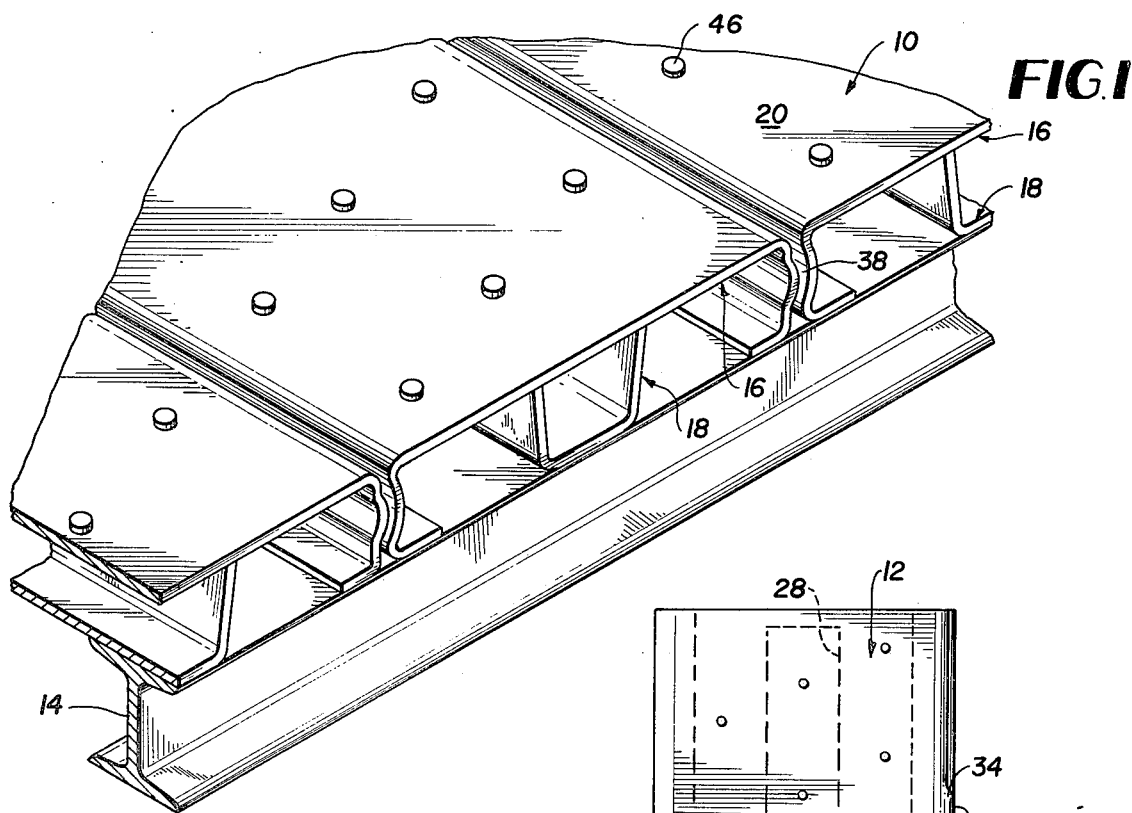
FIG. 1 is a fragmentary isometric view of a section of a nailable steel floor formed from the improved floor planking member according to the present invention.

Referring to the drawings, only a small fragment of the floor 10 of a rail car is shown in FIG. 1 to illustrate the side-by-side relation of the plurality of identical planking members, or planks 12 which make up the floor. The planking members 12 extend transversly of the car and are supported in conventional manner by a plurality of laterally spaced, longitudinally extending beams or girders 14 of the car frame, only one girder 14 being shown in FIG. 1. The structure of the car, apart from the floor and the single girder 14, is not shown as such structure is conventional and forms no part of the invention.

Figure 2:
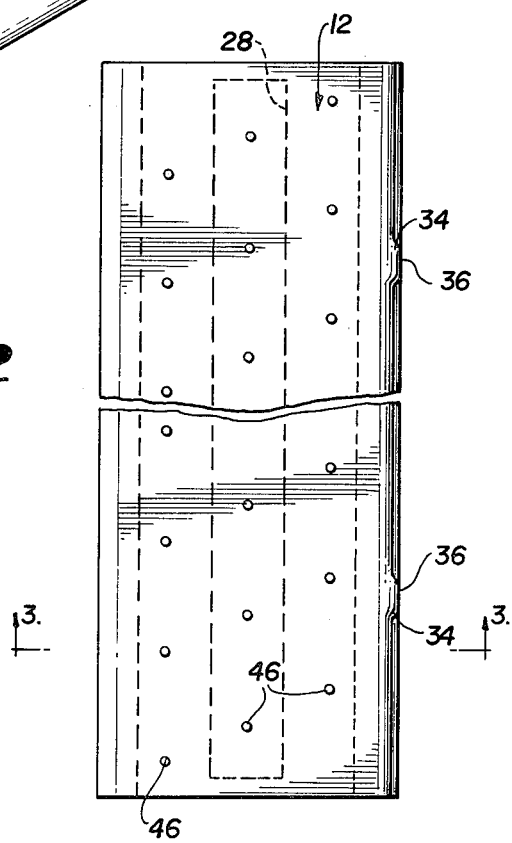
FIG. 2 is a top plan view, on a reduced scale, of a planking member employed in the floor of FIG. 1.
Figure 3:
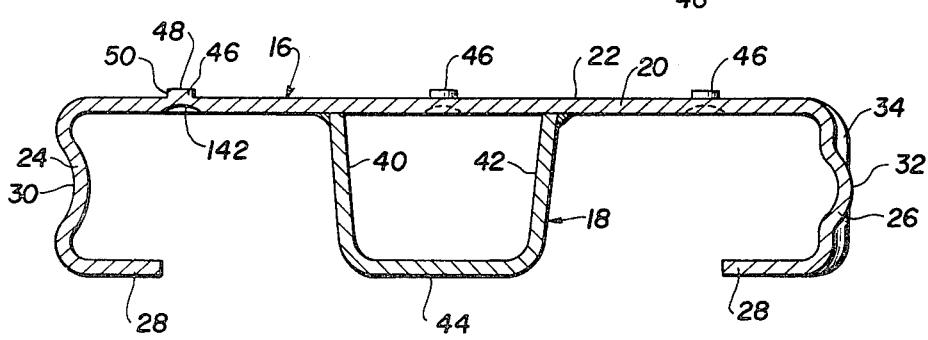
FIG. 3 is a sectional view taken on line 3—3 of FIG. 2.
Figure 4A:
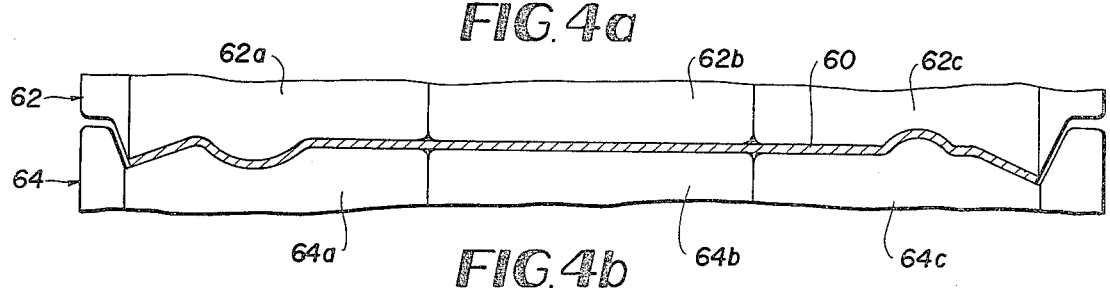
Figure 4B:
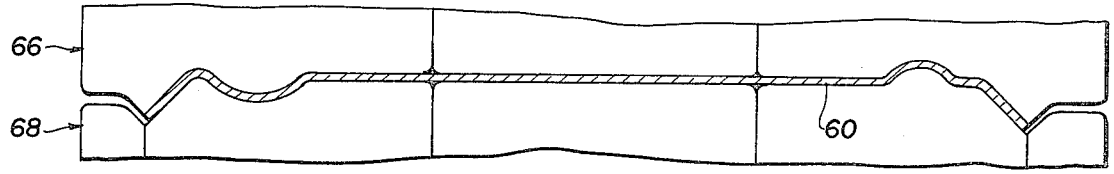
Figure 4C:
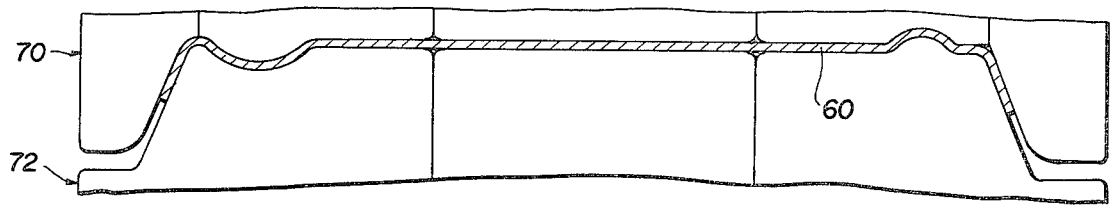
Figure 4D:
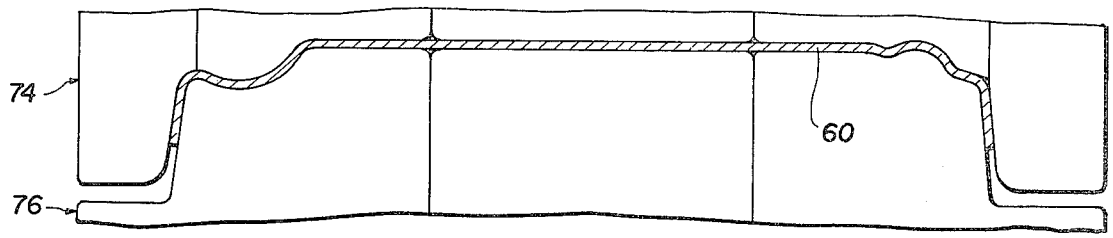
Figure 4E:
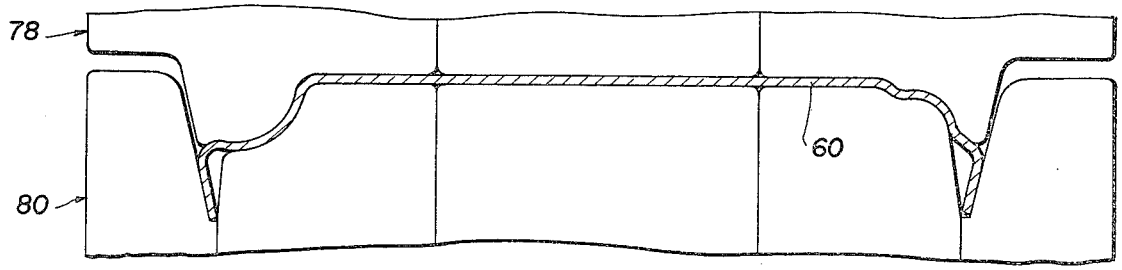
Figure 4F:
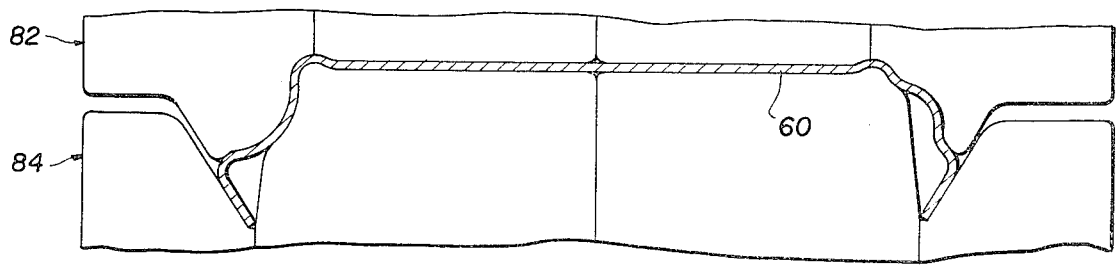

As shown in FIGS. 1-3, the respective floor planking members 12 are welded assemblies made up of a large, load supporting channel 16 and a smaller, generally U-shaped reinforcing channel 18, both of which are formed from heavy-gauge rolled steel strip. The channel members 16 are downwardly open when assembled into a floor, and each includes a central web 20 having a top surface 22 which cooperates with the webs of adjacent channels to define the load bearing surface of the floor 10. The central web 20 of each planking member 12 is supported along its side edge by a pair of integrally formed side flanges 24, 26, each of which terminates at its bottom edge in an inwardly directed ledge 28 adapted to engage and be supported by the girders 14.

The flanges 24 and 26 are each of compound-curve configuration in cross section, with the flange 24 having an outwardly concave or female corrugations 30 extending along its length intermediate the web 20 and the ledge 28, and the flange 26 having an outwardly convex or male corrugations 32 which is substantially complementary to the concave configuration of flange 24. The flange 26 is provided with a plurality of longitudinally spaced apart bridges 34 along its length. Each bridge 34 presents a substantially flat external or outwardly directed surface 36 located in a plane substantially tangent to the laterally outermost portion of the male corrugations 32 and normal to the plane of the top web surface 22. The bridges 34 extend throughout substantially the full height of the flange 26 so as to bridge the female corrugations 30 when two of the planking members are placed in side-by-side relation in a floor 10.

When two planking members 12 are arranged in side-by-side relation in a floor, the male corrugations 32 on the flanges 26 are arranged in opposed, contiguous relation with a female corrugations 30 on a flange 24 of the adjacent planking member. The contiguous concave and convex surfaces are spaced apart by the bridge members 34 to define a substantially sinuous nailing groove 38 therebetween. The compound curve configuration of the opposed surfaces on the adjacent flanges, in combination with the accurate spacing of the planking members by the bridge members 34, provide a nailing groove which at once will permit nails to be driven downwardly therethrough and provides sufficient frictional resistance to withdrawal of the nails to permit nailing braces, skids and the like to the floor to avoid freight movement during shipping. In the assembled relation, the respective planking members are preferably secured in position by welding the ledges 28 directly to the top flange of the supporting girders 14, thereby positively retaining the respective planking members 12 against shifting during use.

The top channels 16 of planking members 12 as thus far described are substantially identical to the planking members described in U.S. Pat. No. 2,852,112, which patent is assigned to the Assignee of the present invention and reference to which may be had for further description of the structure. However, it has been found desirable to reinforce the load supporting web 20 of the planking members intermediate the side flanges 24, 26 in order to minimize distortion of the surface 22 from heavy concentrated or impact loads which may be encountered in use. To this end, the generally U-shaped channel 18 has the free edges of its opposed legs 40, 42 rigidly welded to the bottom surface of the web 20 to reinforce the web along two spaced lines located one on each side of the longitudinal center line of the web and cooperating with the flanges 24, 26 to provide support for the web at four positions across the width of the web. The length of the legs 40, 42 may be such as to position the bottom surface of the web 44 of channel 18 in substantially the same plane as the bottom surface of the ledges 28 to rest directly upon the top surface of the girders 14. It has been found, however, that this configuration can result in the planking members 12 not setting squarely upon the supporting girder either as a result of unevenness of the girder support flange or to the web 44 being slightly below the ledges 28 due to manufacturing tolerances or the like. Accordingly, it is preferable to intentionally dimension the channel 18 to position the bottom surface of the web 44 slightly above the plane of the ledges 28. In this arrangement, only a slight deflection of the web 20 is required to bring the U-shaped reinforcing channel firmly to rest upon the supporting girder to provide additional support for the floor. As indicated in FIG. 2, the U-shaped support channel 28 may also be slightly shorter than the top channel 28 to facilitate assembly by automatic welding machines.

As shown in FIG. 2, each planking member 12 has three longitudinally extending rows of anti-skid projections 46 extending upwardly from the top surface 22. One row of the projections 46 is located on the longitudinal center line of the planking member, with the remaining rows being located one on each side and spaced laterally outward of the center row. The outer rows of projections 46 are preferably located approximately ⅜ the distance from the center row to the outer longitudinal edge of the respective planking members so that, when the floor is assembled, the distance between adjacent rows of projections over the floor is substantially equal. This exact spacing is not critical, however, and in one embodiment of the floor planking members, the distance between adjacent rows of projections on contiguous planking members is slightly greater than the distance between the rows on the individual planking member. As seen in FIGS. 2 and 3, the legs 40, 42 of reinforcing channels 18 are welded to the web 20 in outwardly spaced relation to the central row of projections 46.

The individual anti-friction projections 46 are preferably of substantially cylindrical configuration, having a top surface 48 which is generally parallel to the surface 22 and having side edge surfaces generally normal to the surface 22. This configuration provides a relatively sharp top edge for the respective projections 46 which, in combination with the substantially vertical side edges of the respective projections, provide an exceptionally effective anti-skid surface.

The individual projections 46 in the respective rows of such projections are equally spaced from one another, with the projections in adjacent rows being offset longitudinally of the planking members 12 as shown in FIGS. 1 and 2. This offset relation, in combination with the substantially uniform spacing of the rows of projections over the floor, produces an anti-skid pattern consisting of generally diagonally extending rows of projections across the assembled floor.

In an embodiment of the floor panel assembly in which the channel member 20 is formed from 10 gauge rolled steel strip, i.e., a strip having a thickness of approximately 0.138", the anti-skid projections 46 have a height, above the surface 22, of approximately 1/16", or slightly less than ½ the thickness of the base metal. The individual projections 46 are die-formed from the metal of the channel itself as more fully described hereinbelow.

Referring now to FIGS. 4 through 7, the preferred method of forming the channel member 20 having the anti-skid projections 46 integrally formed thereon from a continuous length of flat rolled steel strip material is illustrated. The strip stock 60 is unrolled from a coil of the material (not shown) and passed through a set of conventional straightening rolls (also not shown) to present a running length of flat straight stock to the nip of an initial set of forming rolls 62, 64 as shown in FIG. 4a. The rolls 62 and 64 may be segmented as illustrated, with the roll 62 consisting of roll segments 62a, 62b and 62c and roll 64 consisting of roll segments 64a, 64b and 64c. Rolls 62, 64 firmly clamp the central portion of the strip 60 and perform the first step in forming the respective side edges of the strip into the configuration of the flanges 24, 26 and the ledges 28. From the initial forming roll set shown in FIG. 4a, the strip passes successively through five additional sets of forming rolls to progressively form the edge portions of the strip to more closely conform to the final configuration of the flanges 24, 26 and the ledges 28, while firmly clamping the central portion of the web to maintain it in a flat, straight condition. Thus, from rolls 62, 64, the strip passes into the nip of rolls 66, 68 at the second forming station shown in FIG. 4b then into the nip of the third set of forming rolls 70, 72 shown at FIG. 4c. This continues through the 4th, 5th, and 6th forming roll sets shown in FIGS. 4d, 4e and 4f, respectively.

Between the 6th and 7th sets of forming rolls, the strip 60, which now has the flanges and ledges substantially formed but deflected from their final position, is passed through the nip of a set of die-forming rolls consisting of three die rolls 86, 88, 90 supported for rotation in opposed relation one to each of a set of pressure rolls 92, 94, 96 which cooperate to form the three continuous rows of anti-skid projections 46 along the length of the metal strip. Following the die-forming operation illustrated at FIG. 4g, the strip 60 passes successively through four additional forming roll sets 98–100, 102–104, 106–108 and 110–112 as shown in FIGS. 4h through 4k. As the strip emerges from the 10th roll forming operation illustrated in FIG. 4k, the channel 16 is completely formed with the dimensions being accurately controlled throughout the forming operation. Since the forming operations performed in the last four sets of forming rolls consist essentially of deflecting or bending the substantially formed flange portions of the strip into the final configuration, relatively little transverse stress is applied to the web portion of the strip. For this reason, it is possible to shape the forming roll which engages the top or outer surface of the web portion of the channel with peripheral grooves 114 which permit the anti-skid projections 46 to pass untouched through the forming roll sets at the final four stations.

Figure 5:
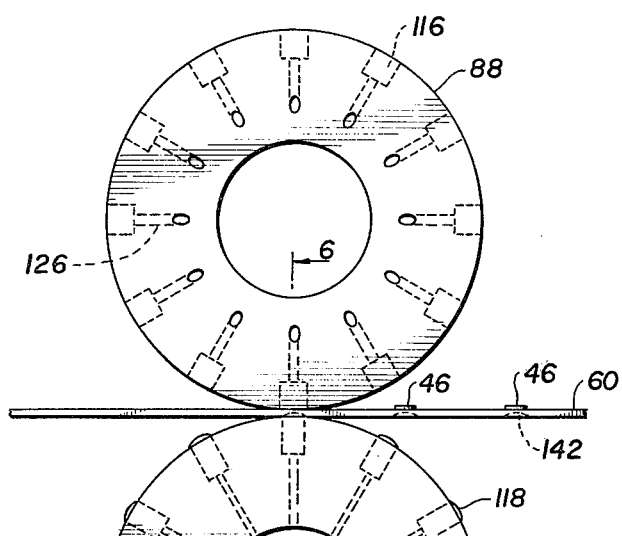
FIG. 5 is an elevation view of two of the die-forming rolls shown in FIG. 4g.
Figure 6:
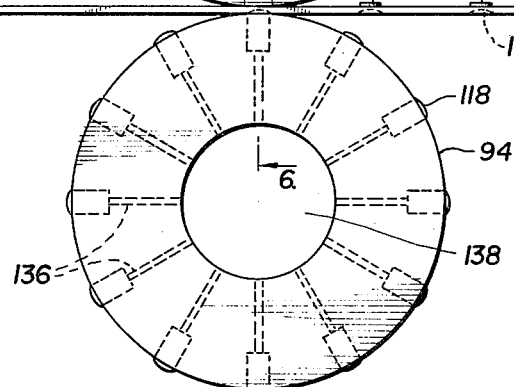
FIG. 6 is an enlarged fragmentary sectional view taken on line 6—6 of FIG. 5.
Figure 6:
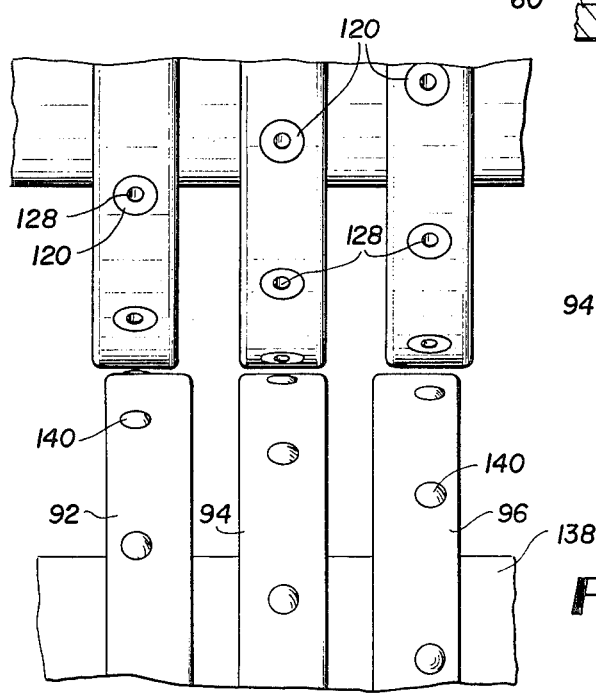
Figure 6:
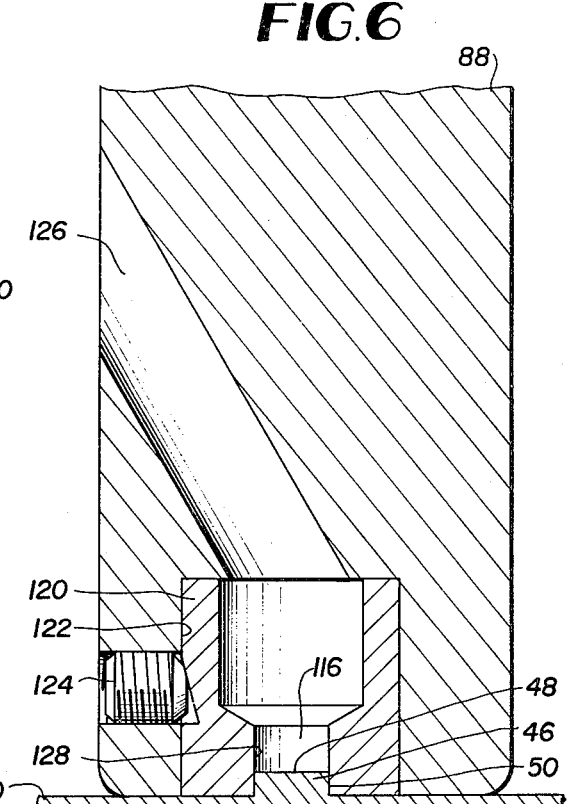
Figure 7:
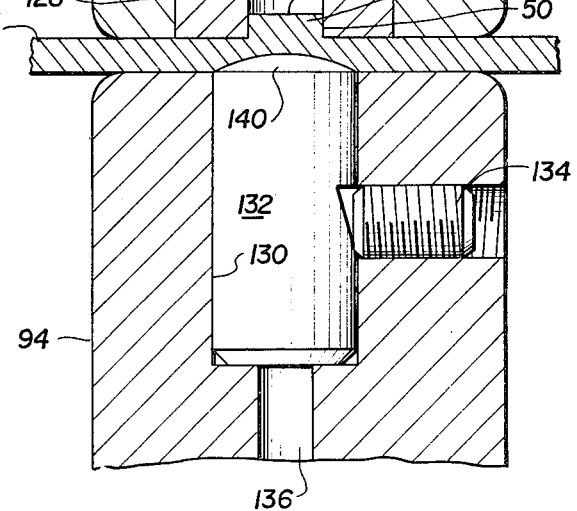
FIG. 7 is an enlarged fragmentary sectional view of the die roll pairs shown in FIG. 4g showing the staggered relation of the die-forming elements on the separate roll pairs.

FIGS. 5 and 6 show the punch roll 94 and the opposed die roll 88 with the strip 60 passing therebetween to form the center roll of anti-skid projections 46. As shown, roll 88 has twelve die cavities 116 in its outer periphery, at equally spaced intervals therearound, which cooperate with a corresponding member of raised pressure points, or punches 118 carried on the periphery of the opposing pressure roll 94. As shown in FIG. 6, the individual die cavities 116 are defined by a cylindrical sleeve or die member 120 formed from a suitably hardened metal and seated within a cylindrical bore 122 within the periphery of the wheel 88. The die member 120 is retained within the bore by suitable means such as the set screw 124. A bore 126 extending from one side face of wheel 88 into the bore 122 enables the die member 120 to be driven from its seat by a suitable tool inserted through bore 126 upon loosening the set screw 124.

Die member 120 has a die cavity in the form of a generally cylindrical bore 128 into which the anti-friction projection 46 is formed. Bore 128 is actually slightly conical to facilitate withdrawal of the short anti-friction projection 46 from within the bore 128. In practice, the bore 128 may be tapered at approximately 5°, which taper will readily permit the anti-friction projection to be withdrawn without damage to the edge of the projection or to the wall of the die member. Nevertheless, the projections 46 are, for all practical purposes, substantially cylindrical with the side face, or edge of the individual projections extending substantially normal to the top surface of the strip 60.

The pressure rolls 92, 94, 96 are each formed with cylindrical recesses 130 around their periphery for receiving a cylindrical, hardened pin pressure element 132 which is retained in the recess 130 by a set screw 134. Radial bores 136 extend from the bottom of the cylindrical recess 130 to the central opening of the respective wheels so that, upon removal of the wheels from their support shaft 138, a suitable rod member inserted within the bore 136 can be employed to positively drive the pressure element 132 from the recess 130.

The individual pressure elements 130 have a substantially spherical outer end 140 which projects outwardly beyond the peripheral rim portion, or surface of the respective pressure wheel. The diameter of the respective pins or pressure elements 132 is substantially greater than the diameter of the die bore 128 so that the spherical end portion 140 of the pin member applies a compressive force over an area substantially greater than the cross-sectional area of the bore 128 of the opposed die. However, the total height, or radial projection, of the spherical section 140 is substantially less than the height of the anti-skid projections. This results in the spherical end 140 forming a depression 142 on the bottom surface of the web 20, with the total volume of the spherical end depression 142 being substantially equal to the total volume of the resulting anti-skid projection 46 formed within the die element.

By firmly clamping the steel strip 60 between the opposed die rolls, the concentrated pressure caused by the projecting end 140 of the pin member 132 causes a cold flow of the metal into the opposed die cavity 128 so that the resulting projection 46 substantially conforms to the cross-sectional configuration of the die cavity. By utilizing a cold flow forming process, as opposed to a direct punching operation, the metal within the area of the anti-skid projections of web 20 is not materially weakened. This enables the relatively straight sided, short projections 46 to withstand substantial shearing force in resisting sliding movement of freight articles supported on the surface of a floor constructed from the flooring plank members constructed in accordance with the present invention.

While I have disclosed a preferred embodiment of my invention, I wish it understood that I do not intend to be restricted solely thereto, but rather that I intend to include all embodiments thereof which would be apparent to one skilled in the art and which come within the spirit and scope of my invention.

What is claimed is:
1. In a nailable steel floor construction including support means supporting a plurality of elongated substantially identical floor planking members, the planking members comprising,
   a structural channel member roll formed from flat steel stock of substantially uniform thickness, the channel member having a central web defining a substantially flat load bearing surface and first and second downwardly depending flange members formed one on each side of the central web and each terminating at its lower edge in an inwardly turned ledge,
   the first flange having a longitudinally extending outwardly concave corrugation formed thereon and the second flange having an outwardly convex corrugation which is substantially complementary to the concave corrugation on the first flange,
   spacing means formed on at least one of the flanges at spaced intervals therealong for engaging the flange on an adjacent planking member in the floor construction to provide a nailing groove therebetween when the planking members are assembled into a floor,
   an elongated substantially U-shaped reinforcing channel rigidly welded to the central web between the flanges and extending substantially the full length of the structural channel, the reinforcing channel having a base web disposed in a plane substantially parallel to the plane of the ledges on the first and second flanges and spaced slightly therefrom in the direction of said central web and upwardly extending legs formed one on each side edge of the base web and terminating in parallel spaced edges, the free edges being rigidly welded to the central web one on each side of the longitudinal center line thereof, and
   a plurality of anti-skid projections of generally cylindrical configuration integrally formed on and projecting outwardly from the load bearing surface of the central web, the anti-skid projections being die pressed from the material of the flat steel stock located in substantially parallel rows extending longitudinally of the structural channel, the anti-skid projections each having a top surface extending generally parallel to and spaced from the load bearing surface of the central web and side edges extending substantially perpendicular to the load support surface of the central web, said top surface and said side edges intersecting at an angle to provide an abrupt, relatively sharp top peripheral edge on the anti-skid projections.

2. The invention as defined in claim 1 wherein said anti-skid projections have a height above the load bearing surface of the central web which is no greater than about half the thickness of the central web.

3. The invention as defined in claim 1 wherein said anti-skid projections are formed in three laterally spaced apart, parallel rows and where one of said rows is located substantially on the longitudinal center line of the central web.

4. The invention as defined in claim 1 wherein the anti-skid projections in each row are equally spaced from one another and wherein the projections in the respective rows are offset from one another by substantially equal amounts to provide substantially diagonally extending rows of anti-skid projections in a floor constructed by a plurality of said planking members arranged in side-by-side relation.

* * * * *